(12) United States Patent  
Nicholas et al.

(10) Patent No.: US 8,568,504 B2
(45) Date of Patent: Oct. 29, 2013

(54) MOISTURE REDUCING APPARATUS

(75) Inventors: Timothy John Nicholas, Southampton (GB); Etienne Rene Jarrier, Basingstoke (GB)

(73) Assignee: General Electric Company, Schenectady, NY (US)

(*) Notice: Subject to any disclaimer, the term of this patent is extended or adjusted under 35 U.S.C. 154(b) by 399 days.

(21) Appl. No.: 13/082,994

(22) Filed: Apr. 8, 2011

(65) Prior Publication Data

US 2012/0255268 A1 Oct. 11, 2012

(51) Int. Cl.
*B01D 46/00* (2006.01)
(52) U.S. Cl.
USPC .......... 55/486; 55/423; 55/445; 55/490; 55/DIG. 25
(58) Field of Classification Search
USPC .......... 55/423, 442, 445, 462, 486, 487, 490, 55/511, DIG. 25
See application file for complete search history.

(56) References Cited

U.S. PATENT DOCUMENTS

| 4,300,918 A | 11/1981 | Cary |
| 5,191,767 A | 3/1993 | Kane et al. |
| 5,620,503 A | 4/1997 | Miller et al. |
| 7,404,837 B2 | 7/2008 | Killion et al. |
| 2007/0294988 A1 | 12/2007 | Miller et al. |
| 2009/0031682 A1 | 2/2009 | Langlands et al. |
| 2009/0044702 A1 | 2/2009 | Adamek et al. |

FOREIGN PATENT DOCUMENTS

| JP | 2000257445 A | * | 9/2000 |
| WO | 87/01959 A1 | | 4/1987 |
| WO | WO 8701959 A1 | * | 4/1987 |

* cited by examiner

*Primary Examiner* — Robert Clemente
(74) *Attorney, Agent, or Firm* — Cantor Colburn LLP

(57) ABSTRACT

A moisture reducing apparatus is provided that includes a housing configured to receive an air stream and a net disposed outside the housing. In the apparatus, the net is held sufficiently loosely to permit movement of the net such that flow through the net is variable over time to remove moisture with the net and to permit a relatively substantial portion of a gaseous and particulate matter in the air stream to continue to flow through the net and inside the housing to protect filter media from moisture.

19 Claims, 4 Drawing Sheets

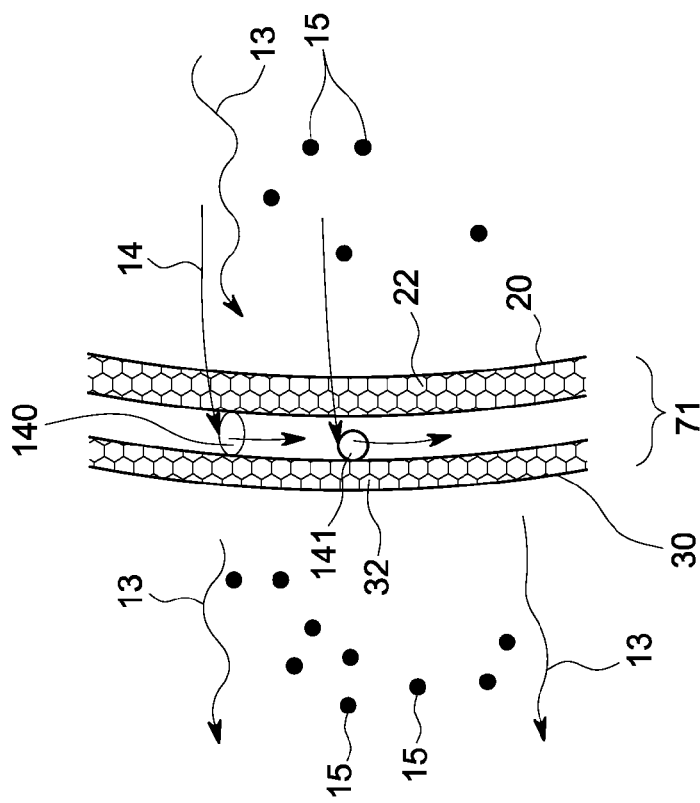
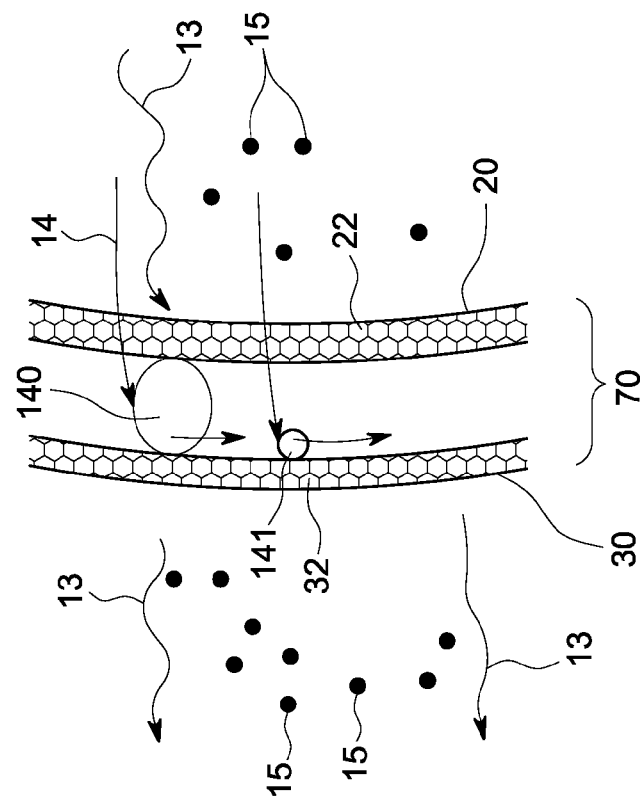

MOISTURE REDUCING APPARATUS

BACKGROUND OF THE INVENTION

The subject matter disclosed herein relates generally to a moisture reducing apparatus. Specifically, the subject matter relates to a moisture reducing apparatus to be used with a gas turbine system.

Generally, gas turbine filtration enclosures and systems are challenged by a combination of dust, particulate and contaminant loads along with local environmental conditions that can include heavy fog periods. The combination of these conditions can prove challenging for final, high efficiency filters even with pulse cleaning systems installed. This is because the combination of conditions can create a layer of "mud" on the filters that increases the pressure loss across the filter and can shorten their operational life.

One approach to solving this issue is to use coalescing pads or filters upstream of the final filters to protect the final filters. These coalescing pads can, however, be maintenance intensive with change out periods as frequently as every week.

BRIEF DESCRIPTION OF THE INVENTION

According to one aspect of the invention, a moisture reducing apparatus is provided that includes a housing configured to receive an air stream and a net disposed outside the housing. In the apparatus, the net is held sufficiently loosely to permit movement of the net such that flow through the net is variable over time to remove moisture with the net and to permit a relatively substantial portion of a gaseous and particulate matter in the air stream to continue to flow through the net and inside the housing to protect filter media from moisture.

According to another aspect of the invention, an apparatus for catching fog and mist is provided and includes a filter housing, including an inlet wall with at least one passage that defines a pathway along which an air stream flows and two or more nets sequentially disposed outside the pathway. The apparatus further includes a suspension coupled to the inlet wall and the two or more nets to suspend the two or more nets on the inlet wall and to hold the two or more nets sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow into the filter housing and a mechanism included in the suspension configured to enable extension and retraction of the two or more nets.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is an enlarged view of first and second nets of the gas turbine inlet;
FIG. 3 is an enlarged view of the first and second nets of the gas turbine inlet of FIG. 1 at a different time from a time shown in FIG. 2.

The detailed description explains embodiments of the invention, together with advantages and features, by way of example with reference to the drawings.

DETAILED DESCRIPTION OF THE INVENTION

Figure 1:
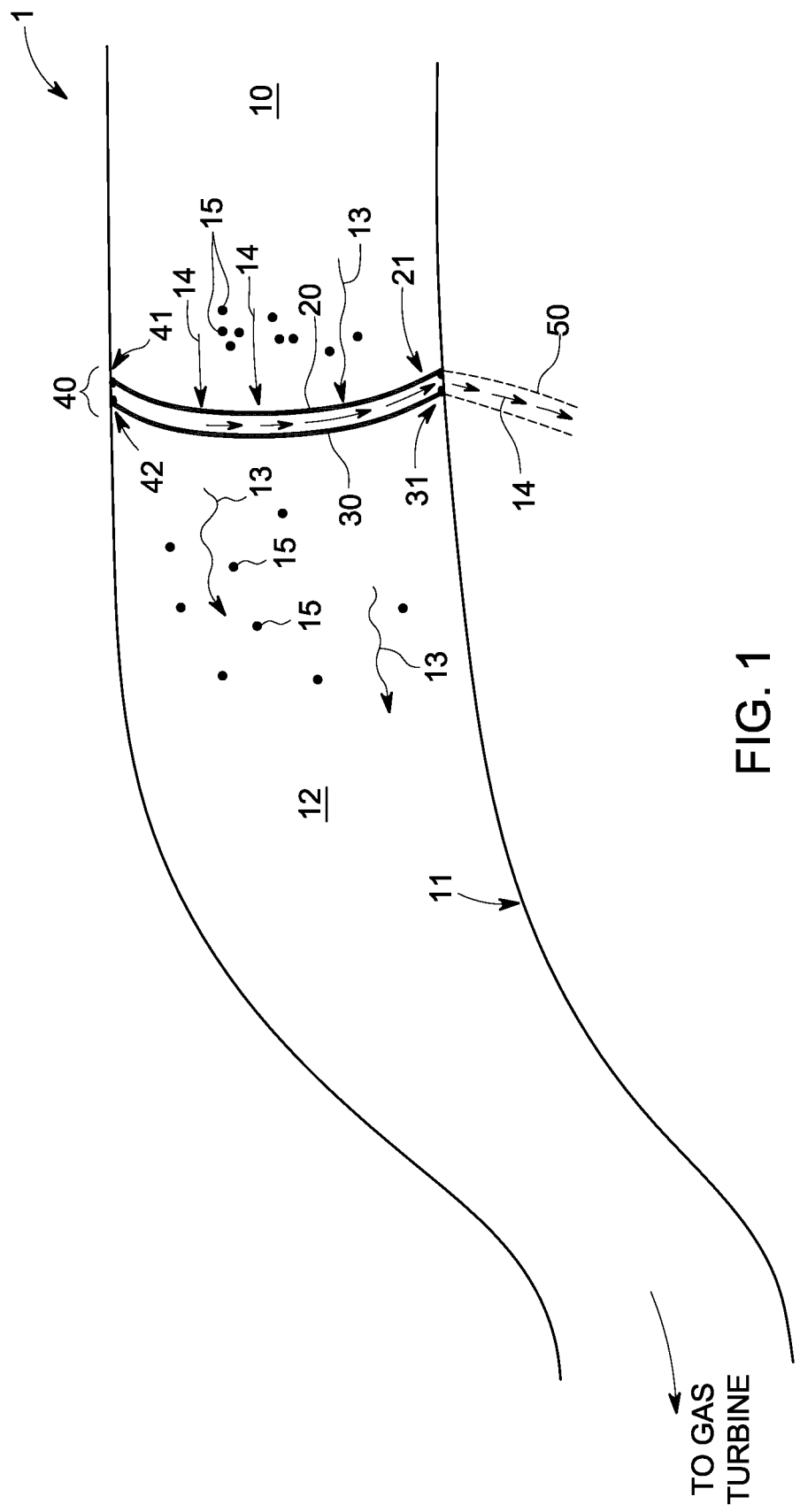
FIG. 1 is a side view of an exemplary gas turbine inlet.

With reference to FIGS. 1-3, an apparatus 1 is provided as an upstream protection device for, e.g., a filtration part of a gas turbine inlet of a gas turbine engine or a machine/inlet requiring filtration for an airstream. The apparatus 1 serves to coalesce relatively fine mist, fog particles and droplets into larger droplets that are then gravitationally removed from the airstream by drainage action. The apparatus 1 permits dust to pass through, however, and thus does not become clogged. Where dust is captured, it is washed away as the large droplets drain.

The apparatus 1 includes an inlet 10. The inlet 10 includes a peripheral wall 11 that may be formed with various shapes and sizes and may have for example ovoid or rectangular cross-sections. The peripheral wall 11 is formed to define a pathway 12 along which gaseous matter 13, fluidic matter 14 and particulate matter 15 flow within the airstream toward the gas turbine or, in other embodiments, a machine or an inlet to another unit.

The apparatus 1 further includes two or more nets, such as first net 20 and second net 30, which are sequentially disposed in the pathway 12 such that the second net 30 is disposed downstream from the first net 20 and such that the airstream impinges upon the first net 20 and then the second net 30. The apparatus 1 further includes a suspension 40 and, in some embodiments, a drainage system 50. The suspension 40 is coupled to the peripheral wall 11 as well as the first and second nets 20 and 30 to suspend the first and second nets 20 and 30 on the peripheral wall 11. The drainage system 50 provides a system into which condensed fluid drains off of the first and second nets 20 and 30.

The suspension 40 suspends the first and second nets 20 and 30 on the peripheral wall 11 with substantially little or no clearance between each of the first and second nets 20 and 30 and the peripheral wall 11. In this embodiment, the airstream is forced through the first and the second nets 20 and 30 and is prevented from seeking a path of least resistance around the first and second nets 20 and 30. The suspension 40 may be coupled substantially to an entire periphery 21 and 31 of each of the first and second nets 20 and 30, respectively, and to the peripheral wall 11. In addition or alternatively, the pathway 12 may be defined substantially entirely through the first and second nets 20 and 30. The suspension 40 may include a single part for each of the first and second nets 20 and 30 or separate sub-suspensions 41 and 42 for each of the first and second nets 20 and 30, respectively.

The first net 20 and the second net 30 are held sufficiently loosely to permit relative movement the first net 20 with respect to the second net 30 and vice versa in response to airstream impingement thereon. The first and second nets 20 and 30 may each have a substantially similar tension or a unique tension. In either case, a degree of the relative movement is ever-changing and, as a result of the ever-changing relative movement of the first and second nets 20 and 30, an effective pore size 70 and 71 (see FIGS. 2 and 3, respectively)

of the first and second nets 20 and 30 is variable over time. The variability of the effective pore sizes 70, 71 encourages moisture reduction or fluidic condensation at one or both of the first and second nets 20 and 30. Conversely, the effective pore sizes 70, 71 are each maintained large enough to permit a relatively substantial portion of the gaseous and particulate matter to continue to flow toward the turbine or at least through the first and second nets 20 and 30. As discussed herein, the effective pore size is the size of openings for flow of air and particles created by the positions of the nets 20 and 30 relative to one another.

In one embodiment, one of the first net 20 and the second net 30 is held sufficiently loosely to permit movement of the single net in response to airstream impingement thereon. The single net, 20 or 30, may each have a suitable tension to achieve the desired moisture reduction as gaseous, fluid and particular matter flow through the net. Further, a degree of movement of the net is ever-changing and, as a result the flow through the net is variable over time. In addition, in the configuration with two or more nets 20, 30, the two nets may comprise a single net doubled over or folded to provide two net areas for moisture reduction and capture.

As shown in FIGS. 2 and 3, the gaseous matter 13, fluidic matter 14 and particulate matter 15 impinge upon the first and second nets 20 and 30, which each have a characteristic pore size 22 and 32, respectively, of about 1 mm. A typical net 20 or 30 may be formed of a Raschel Weave having a lacelike, open construction of a relatively heavy, textured yarn held in place by a much finer yarn, a shade net type with shading values from about 35% to about 80%, for example, or similar net types. The impingement of matter upon the first and second nets causes a relative movement of about 5 cm or more and could be as much as half the perpendicular height (or length or width) of the first and second nets 20 and 30 and may lead to a billowing, wave-like or turbulent effect on the first and second nets 20 and 30.

The condensation of the fluidic matter 14 may occur at either or both of the first and second nets 20 and 30. For example, as shown in FIGS. 2 and 3, the droplet 140 contacts each net. Conversely, the droplet 141 contacts only the second net 30 although it is understood that it could also contact only the first net 20.

The first and second nets 20 and 30 may be disposed vertically with respect to a direction of gravity or at least substantially perpendicularly with respect to a predominant direction of flow along the pathway 12. In some embodiments, the first and second nets 20 and 30 may be disposed at an angle with respect to the flow along the pathway 12 but sufficiently vertically whereby gravitational drainage of condensed fluid is encouraged and/or facilitated. Further, the first and second nets 20 and 30 may be disposed in parallel with one another or traversely with respect to one another.

In accordance with other aspects, a method of assembling an inlet 10 of a gas turbine engine is provided and includes suspending two or more nets, such as the first net 20 and the second net 30, sequentially in a pathway 12 defined by a peripheral wall 11 of the inlet 10 along which gaseous matter 13, fluidic matter 14 and particulate matter 15 flow as described above. Here, the suspending provides substantially little or no clearance between each net 20, 30 and the peripheral wall 11. Also, the suspending includes leaving the first and second nets 20 and 30 held sufficiently loosely to permit relative movement of each such net that an effective pore size 70, 71 of the first and second nets 20, 30 is variable over time to encourage fluidic condensation at the first and second nets 20, 30 and to permit a relatively substantial portion of the gaseous and particulate matter to continue to flow.

Figure 4:
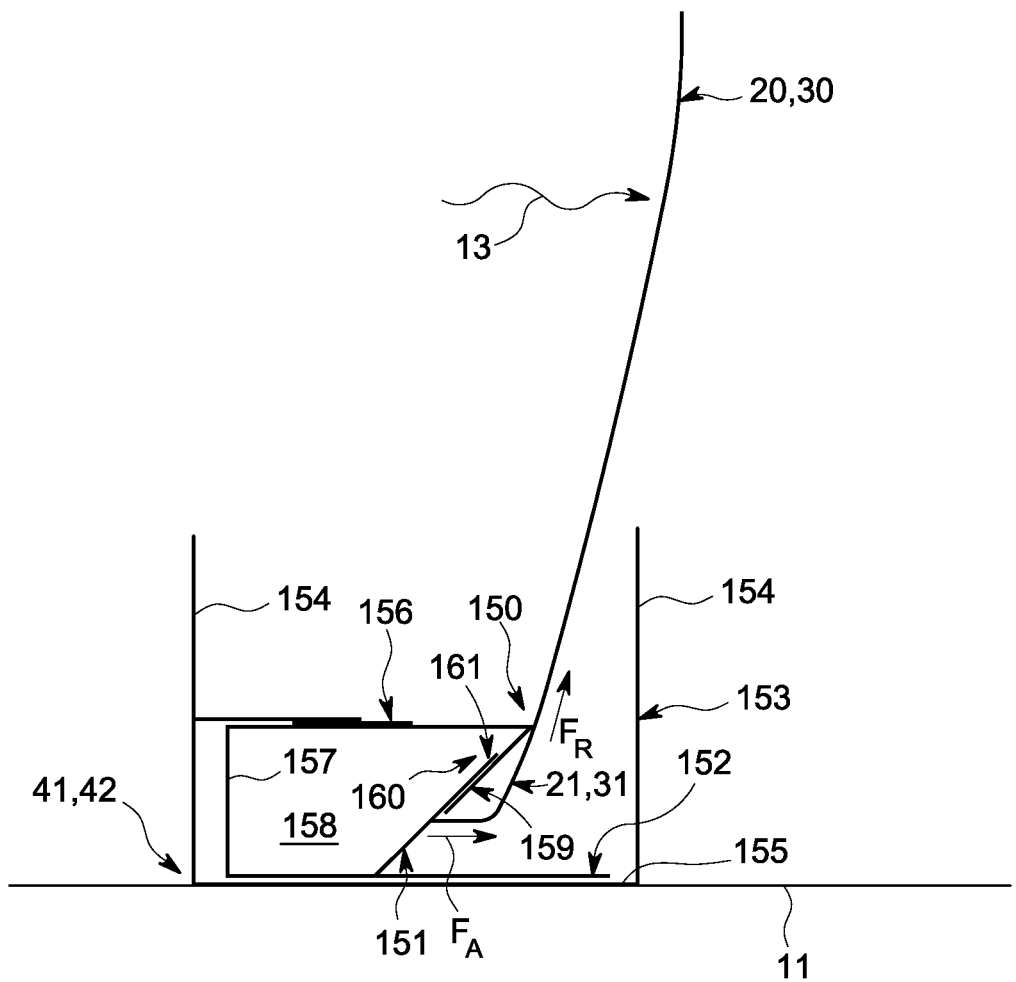
FIG. 4 is an enlarged view of a suspension assembly for the first and second nets.

With reference to FIG. 4, sub-suspensions 41, 42 may be formed as a retention system 150 that retains a pocket neck extrusion 151, to which the first or the second net 20 or 30 may be attached, in an inner frame 152, which is itself supported by an outer frame 153. In accordance with embodiments, the entire periphery 21 or 31 of each of the first or the second net 20 or 30 may be sewn or otherwise connected to the pocket neck extrusion 151, which is a substantially rigid member having a shape that generally corresponds to a shape of the periphery 21 or 31 of the first or the second net 20 or 30. The inner frame 152 may also be a substantially rigid member having a shape that generally corresponds to a shape of the periphery 21 or 31 of the first or the second net 20 or 30 so that retention of a substantial entirety of the pocket neck extrusion 151 is possible.

As shown in FIG. 4, the outer frame 153 includes sidewalls 154 extending from opposing ends of a base 155 and a notch 156 positioned along a mid-section of one of the sidewalls 154. The outer frame 153 may be installed within the pathway 12 by attachment of the base 155 to the peripheral wall 11 with little or no clearance. The outer frame 153 may be formed of any suitable material, such as, for example, a metal or a metallic alloy and may be formed to surround the first or the second net 20 or 30 or as multiple assemblies arranged at various positions around the peripheral wall 11 as long as there is little or no clearance between the inner frame 152 and the peripheral wall 11.

The inner frame 152 includes a frame structure 157 having, for example, a u-shaped cross section that defines an interior 158 and a member 159 coupled to a portion of the frame structure 157 at an angle to form a pocket 160. The interior 158 may be receptive of the pocket neck extrusion 151, which, once received therein, may be oriented with a cross-sectional end 161 disposed in the pocket 160. The inner frame 152 may then be inserted into the outer frame 153 between the sidewalls 154 and between the base 155 and the notch 156 so that the portion of the frame structure 157 to which the member 159 is coupled to form the pocket 160 abuts the notch 156. With this arrangement, no combination of axial forces, $F_A$, or radial forces, $F_R$, can be applied to the retention system 150 as shown in FIG. 4 by the first or the second net 20 or 30 in order to remove the pocket neck extrusion from the pocket 160 or the inner frame 152 from the outer frame 153.

Figure 5:
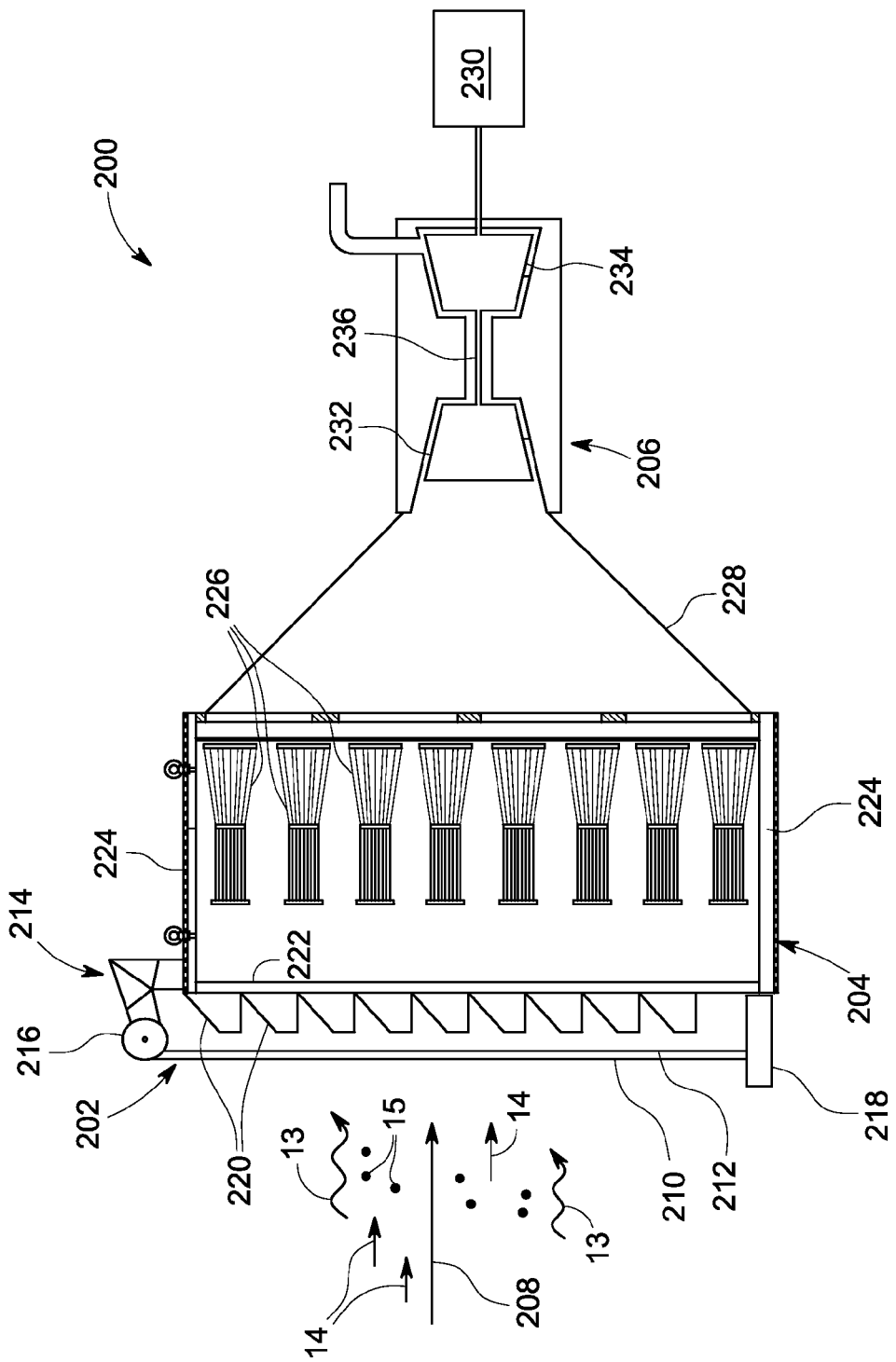
FIG. 5 is a schematic diagram of an embodiment of a power generation system.

FIG. 5 is a schematic diagram of an embodiment of a power generation system 200. The power generation system 200 includes a flow control apparatus 202, filter housing 204 and turbine 206. The flow control apparatus 202 is configured to remove fluidic matter from an airstream 208 to be received by the power generation system 200. The air stream 208 includes gaseous matter 13, fluidic matter 14 and particulate matter 15. The flow control apparatus 202 includes a first net 210 and second net 212 suspended from a suspension 214. The nets 210, 212 can placed in a fixed structure or a retractable structure, such as suspension 214, outside the filter house 204. In an embodiment, the suspension 214 includes a pivotally mounted spool 216, wherein the spool 216 is configured to enable extension and retraction of the first and second nets 210 and 212, depending on conditions. The extended nets 210 and 212 are received by a retention system 218, wherein the retention system 218 and suspension 214 are configured to provide a selected amount of tension and/or looseness for the first and second nets 210 and 212. In one embodiment, the nets 210 and 212 are extended and held sufficiently loosely to permit relative movement of each of the two nets 210 and 212 such that the effective pore size of the nets is variable. The variable pore size encourages condensation of the fluidic matter 14 at the nets 210 and 212 while permitting the gas 13

(i.e. air) and particulate matter 15 to flow beyond the nets. The first and second nets 210 and 212 may be constructed and as described above with reference to FIGS. 1-3. An alternative to the retractable structure of suspension 214 may include first and second nets 210 and 212 held in a fixed frame structure. In an exemplary embodiment, the fixed frame structure may include nets such as insect nets or pollen screens.

Still referring to FIG. 5, hoods 220 are located inside the nets 210 and 212 and include passages to receive the gas 13 and particulate matter within the filter housing 204. As depicted, the first and second nets 210 and 212 are positioned outside of or external to the filter housing 204. The filter housing 204 comprises an inlet wall 222 and sidewalls 224 encompassing one or more filter media, such as filters 226. The filters 226 are configured to remove a substantial portion of the particulate matter 15 from the air stream 208, thereby providing gas 13 to the turbine 206. The gas 13 is provided via a duct 228 to the turbine 206 to produce mechanical output to a load 230. The exemplary turbine 206 comprises a gas turbine that includes a compressor 232 and turbine 234 coupled by a shaft 236. The turbine 206 and load 230 may be located inside a structure, such as a plant building, while at least a portion of the filter housing 204 is located outside the structure.

In an example where the environmental conditions include airborne moisture, such as fog and mist, the air stream 208 flows through the flow control apparatus 202, wherein a substantial portion of the fluidic matter 14 condenses on the first and second nets 210 and 212. The airstream flows into the filter housing 204 through the hoods 220, which further prevent fluidic matter 14 and particulate matter 15 from entering the housing. While the nets 210 and 212 are extended from the suspension 214 to the retention system 218, the nets 210 and 212 are substantially flush or abutting the retention system 218 and suspension 214. Further, the nets 210 and 212 extend substantially over the entire inlet wall 222, thereby causing the air stream 208 to flow substantially entirely through the nets. In other conditions, such as dry conditions with low fluidic matter 14 content in the air, the first and second nets 210 and 212 may be retracted by the suspension 214 to provide a flow path for the air stream 208 directly into the filter housing 204.

The suspension 214 may be any suitable arrangement and structure to enable positioning of two or more nets 210 and 212 outside the filter housing 204. The embodiment of suspension 214 that includes a retraction mechanism, such as spool 216, enables selective use of the nets 210 and 212 to remove fluid from the air stream 208 based on environmental conditions or other factors. The retraction mechanism may include the spool 216 and/or other suitable retraction/extension mechanisms, such as biasing members and tensioners. The retention system 218 may include any suitable mechanism to enable coupling of one or more peripheral edges of the nets 210 and 212 to a periphery of the inlet wall 222. One embodiment of the retention system 218 may include the mechanisms depicted in FIG. 4.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A moisture reducing apparatus comprising:
   a housing configured to receive an air stream; and
   two or more nets sequentially disposed outside the housing, the two or more nets being held sufficiently loosely to permit movement of the two or more nets such that flow through the net is variable over time to remove moisture with the two or more nets and to permit a relatively substantial portion of a gaseous and particulate matter in the air stream to continue to flow through the two or more nets and inside the housing to protect filter media from moisture.

2. The apparatus according to claim 1, wherein the housing is configured to direct the air stream through filter media to a gas turbine.

3. The apparatus according to claim 1, wherein the two or more nets each have pore sizes of less than about 1 mm.

4. The apparatus according to claim 1, wherein the two or more nets comprise a Raschel Weave.

5. The apparatus according to claim 1, wherein the two or more nets comprise a shade netting with shade performance of about 35% to about 80%.

6. The apparatus according to claim 1, wherein the relative movement is more than about 5 cm.

7. The apparatus according to claim 1, wherein the relative movement is up to half a perpendicular length of either of the two or more nets.

8. The apparatus according to claim 1, wherein the housing contains at least one filter to remove particulate matter from the air stream.

9. The apparatus according to claim 1, wherein the two or more nets each have a substantially similar tension.

10. The apparatus according to claim 1, wherein fluidic condensation occurs at least at one of the two or more nets.

11. The apparatus according to claim 1, wherein the two or more nets are oriented substantially perpendicularly with respect to a predominant direction of air stream flow along a pathway.

12. The apparatus according to claim 1, wherein the two or more nets are disposed sufficiently vertically whereby gravitational drainage of condensed fluid is encouraged.

13. The apparatus according to claim 1, comprising a suspension configured to enable extension and retraction of the two or more nets.

14. The apparatus according to claim 1, wherein the housing comprises a flow inlet wall and the two or more nets are configured to cover substantially the entire flow inlet wall to remove fluidic matter from the air stream.

15. An apparatus, comprising:
   a filter housing, including an inlet wall with at least one passage that defines a pathway along which an air stream flows;
   two or more nets sequentially disposed outside the pathway;
   a suspension coupled to the inlet wall and the two or more nets to suspend the two or more nets on the inlet wall and to hold the two or more nets sufficiently loosely to permit relative movement of each of the two or more nets such that an effective pore size of the two or more nets is variable over time to encourage fluidic condensation at the two or more nets and to permit a relatively substantial portion of the gaseous and particulate matter to continue to flow into the filter housing; and
   a mechanism included in the suspension configured to enable extension and retraction of the two or more nets.

16. The apparatus according to claim 15, wherein the filter housing is configured to direct the air stream to a gas turbine via at least one filter media configured to remove particulate matter from the air stream.

17. The apparatus according to claim 15, wherein the two or more nets comprise a shade netting with shade performance of about 35% to about 80%.

18. The apparatus according to claim 15, wherein the filter housing comprises a flow inlet wall and the two or more nets are configured to cover substantially the entire flow inlet wall to remove fluidic matter from the air stream.

19. A moisture reducing apparatus comprising:
a structure disposed outside a housing configured to receive an air stream for a gas turbine; and
two or more nets sequentially disposed on the structure, the two or more nets being held sufficiently loosely to permit relative movement of each of the two or more nets such that an effective pore size of the two or more nets is variable over time to remove moisture at the two or more nets and to permit a relatively substantial portion of a gaseous and particulate matter in the air stream to continue to flow through the nets and inside the housing.

* * * * *